United States Patent
Bedare et al.

(10) Patent No.: US 10,732,683 B2
(45) Date of Patent: Aug. 4, 2020

(54) PERFORMANCE IMPROVEMENT BY RELEASING DISPLAY POWER FOR COMPUTE BURSTS

(71) Applicant: Intel Corporation, Santa Clara, CA (US)

(72) Inventors: Sachin Bedare, Bangalore (IN); Mallari Hanchate, Bangalore (IN); Praveen Kashyap Ananta Bhat, Bangalore (IN); Govindaraj Gettimalli, Bangalore (IN); Vijayakumar A. Dibbad, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 184 days.

(21) Appl. No.: 15/967,116

(22) Filed: Apr. 30, 2018

(65) Prior Publication Data

US 2019/0041931 A1 Feb. 7, 2019

(51) Int. Cl.
*G06F 1/26* (2006.01)
*G06F 1/32* (2019.01)
*G06F 1/3234* (2019.01)
*G06F 1/3287* (2019.01)

(52) U.S. Cl.
CPC .............. *G06F 1/26* (2013.01); *G06F 1/3265* (2013.01); *G06F 1/3287* (2013.01)

(58) Field of Classification Search
CPC ......... G06F 1/26; G06F 1/3265; G06F 1/3287
See application file for complete search history.

(56) References Cited

U.S. PATENT DOCUMENTS

| | | | |
|---|---|---|---|
| 9,354,657 B1 | 5/2016 | Keller et al. | |
| 9,430,009 B2 * | 8/2016 | Yokoyama | G06F 1/26 |
| 2003/0149904 A1 * | 8/2003 | Kim | G06F 1/3203 713/330 |
| 2005/0075768 A1 | 4/2005 | Nicholson et al. | |
| 2005/0272402 A1 | 12/2005 | Ferentz et al. | |
| 2006/0005057 A1 | 1/2006 | Nalawadi et al. | |
| 2007/0285137 A1 | 12/2007 | Li | |
| 2014/0201542 A1 * | 7/2014 | Kommrusch | G06F 1/28 713/300 |

FOREIGN PATENT DOCUMENTS

WO 2019212666 A1 11/2019

* cited by examiner

*Primary Examiner* — Stefan Stoynov
(74) *Attorney, Agent, or Firm* — Patent Capital Group

(57) ABSTRACT

In some embodiments, power may be temporarily removed from a first portion of a computer system (such as a display), and that power redirected to a second portion (such as a processor or System on a Chip), so that extra performance may be obtained from the second portion without exceeding the power budget for the system. If the first portion is a display, the time period of removed power may be short enough that the absence of luminance during that time period will not be noticeable to the human vision system. In a similar embodiment, power may be delivered to the first portion using pulse width modulation, using the time between pulses to redirect power to the other portion.

17 Claims, 5 Drawing Sheets

PERFORMANCE IMPROVEMENT BY RELEASING DISPLAY POWER FOR COMPUTE BURSTS

TECHNICAL FIELD OF THE INVENTION

In general, the technical field may include reducing power to one portion of a computer system in short bursts and adding that power to the power budget of another portion of the system. This may be done in ways that do not affect the effective performance of the portion losing power.

BACKGROUND

In an approach called Burst Processing, the performance of a processor or System on a Chip (SoC) may be temporarily increased by increasing the power budget of the processor. Running at this increased speed for a substantial time period could cause overheating or other negative effects. However, since these clock speeds are typically measured in gigahertz (GHz), the increased speed may be maintained for just a few milliseconds (or even microseconds) and still achieve a measurable increase in performance if repeated over time. By repeating the burst processing at regular or irregular intervals, any small amount of overheating may be dissipated during the periods between bursts, while the longer-term improvement in performance over time may be noticeable. However, providing the increased power budget for these bursts may be difficult. In some implementations, extra power may be stored in a capacitor during normal operation, and the stored energy used to provide the extra power during burst processing. But capacitors tend to be large and bulky, and not fit into the slim form factor requirements of thin devices such as smart phones and touchscreen pads.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented fully or partially in software and/or firmware. This software and/or firmware may take the form of instructions contained in or on a non-transitory computer-readable storage medium. The instructions may be read and executed by one or more processors to enable performance of the operations described herein. The medium may be internal or external to the device containing the processor(s), and may be internal or external to the device performing the operations. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Figure 1:
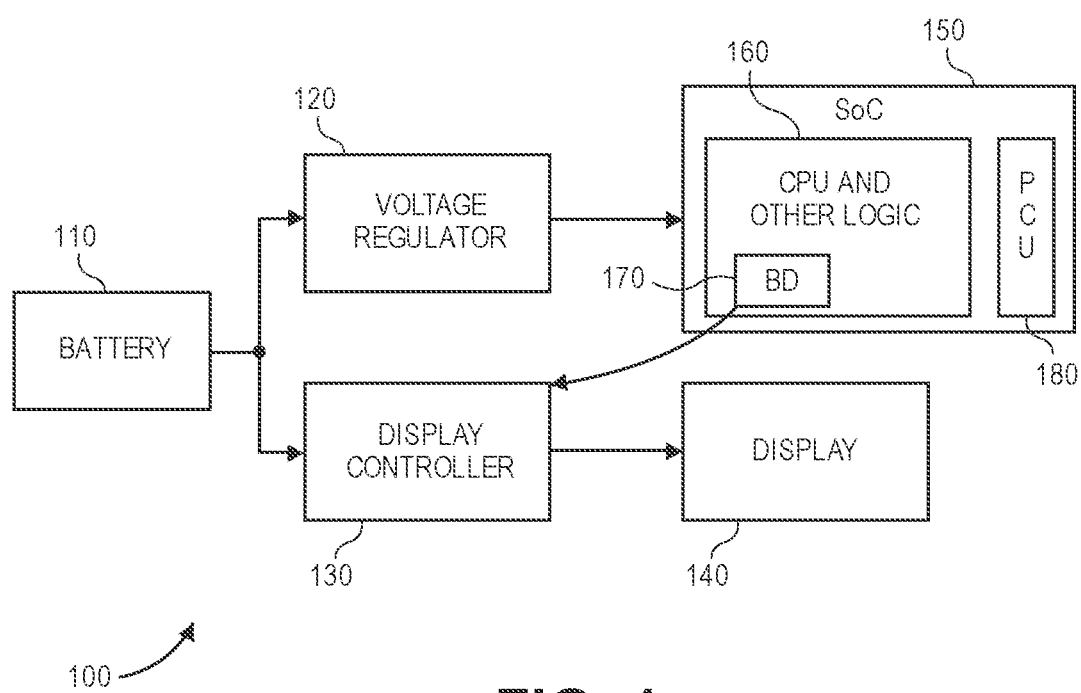
FIG. 1 shows a block diagram of a computer system with a display, according to an embodiment of the invention.

FIG. 1 shows a block diagram of a computer system with a display, according to an embodiment of the invention. In the illustrated embodiment, battery 110 may provide electrical power for computer system 100. Voltage regulator 120 may control the voltage and current that is available to System on a Chip (SoC) 150. The SoC 150 may contain various logic components, such as but not limited to CPU 160, Power Control Unit (PCU) 180, and backlight display controller logic 170 (BD) to provide control and feedback signals to Display Controller 130. Display Controller 130 may provide control signals to Display 140, such as signals to control the available power to, and resulting luminance of, the display. Other embodiments of system 100 are also possible. For example, some embodiments may include two or more displays, each with its own display controller.

The display may use various technologies. In one embodiment, the display may use light emitting diode (LED) elements or organic light emitting diode (OLED) elements, in which the luminance of the display responds very quickly to changes in power delivered to the display elements.

Figure 2:
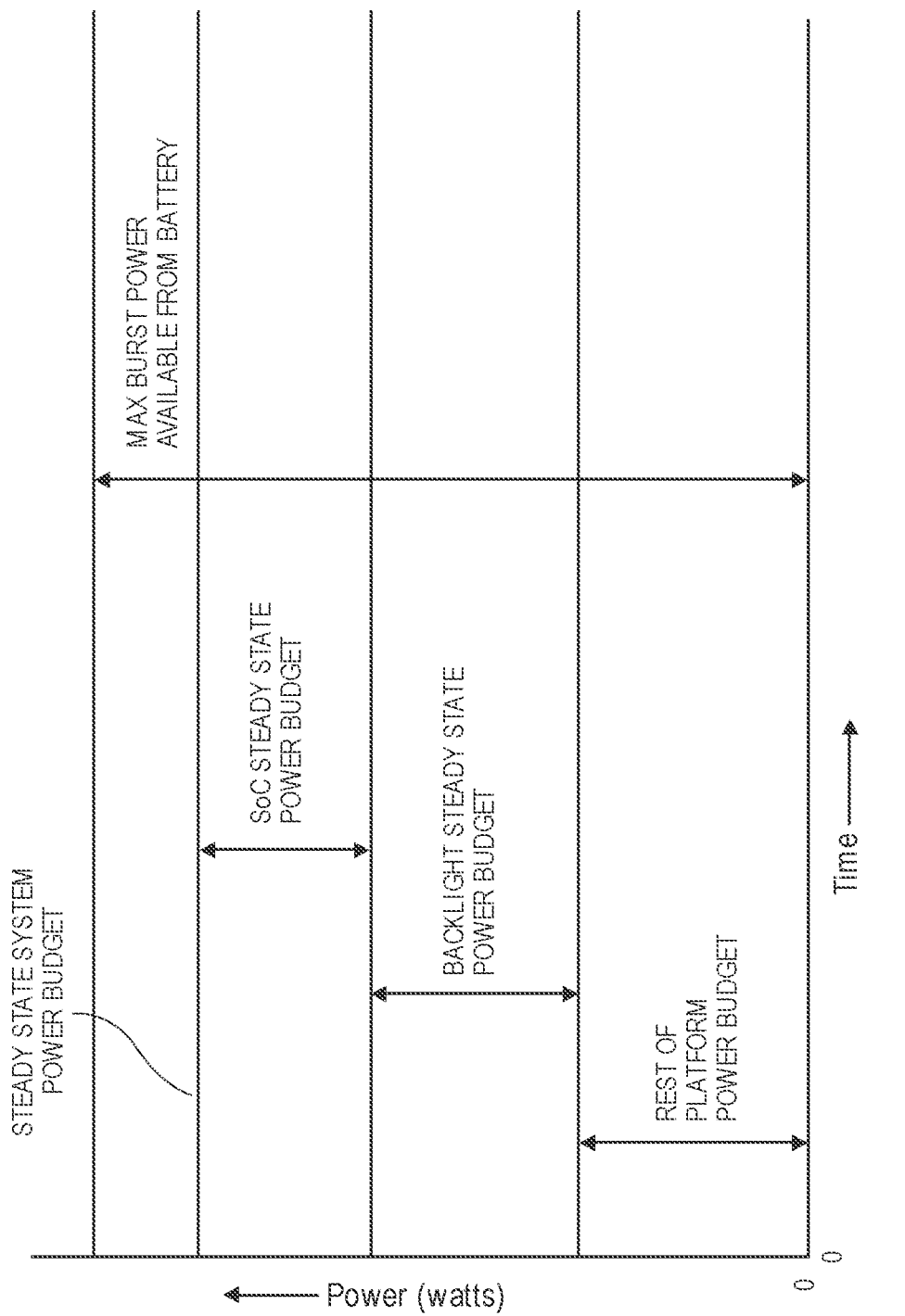
FIG. 2 shows a diagram of how a power budget may be distributed through the computer system 100, according to an embodiment of the invention.

FIG. 2 shows a diagram of how a power budgets may be distributed through the computer system, according to an embodiment of the invention. In the context of this document, a power 'budget' is not necessarily the same as the actual power being used, which may vary. The power budget may be the maximum allowable power that is allocated for a specific computer system or portion of a computer system.

FIG. 2 shows how maximum system burst power available from a power-source (such as a battery) may be shared between SoC/processor burst power budget, backlight power, and rest-of-platform power. SoC burst power budget can thus be calculated by subtracting backlight and rest-of-platform budgets from maximum burst power available. The sum of these power budgets is shown as the steady state system power budget. In operation, the amount of power actually consumed in each of these categories may vary, but for simplicity the available power budgets are shown as steady state.

Figure 3:
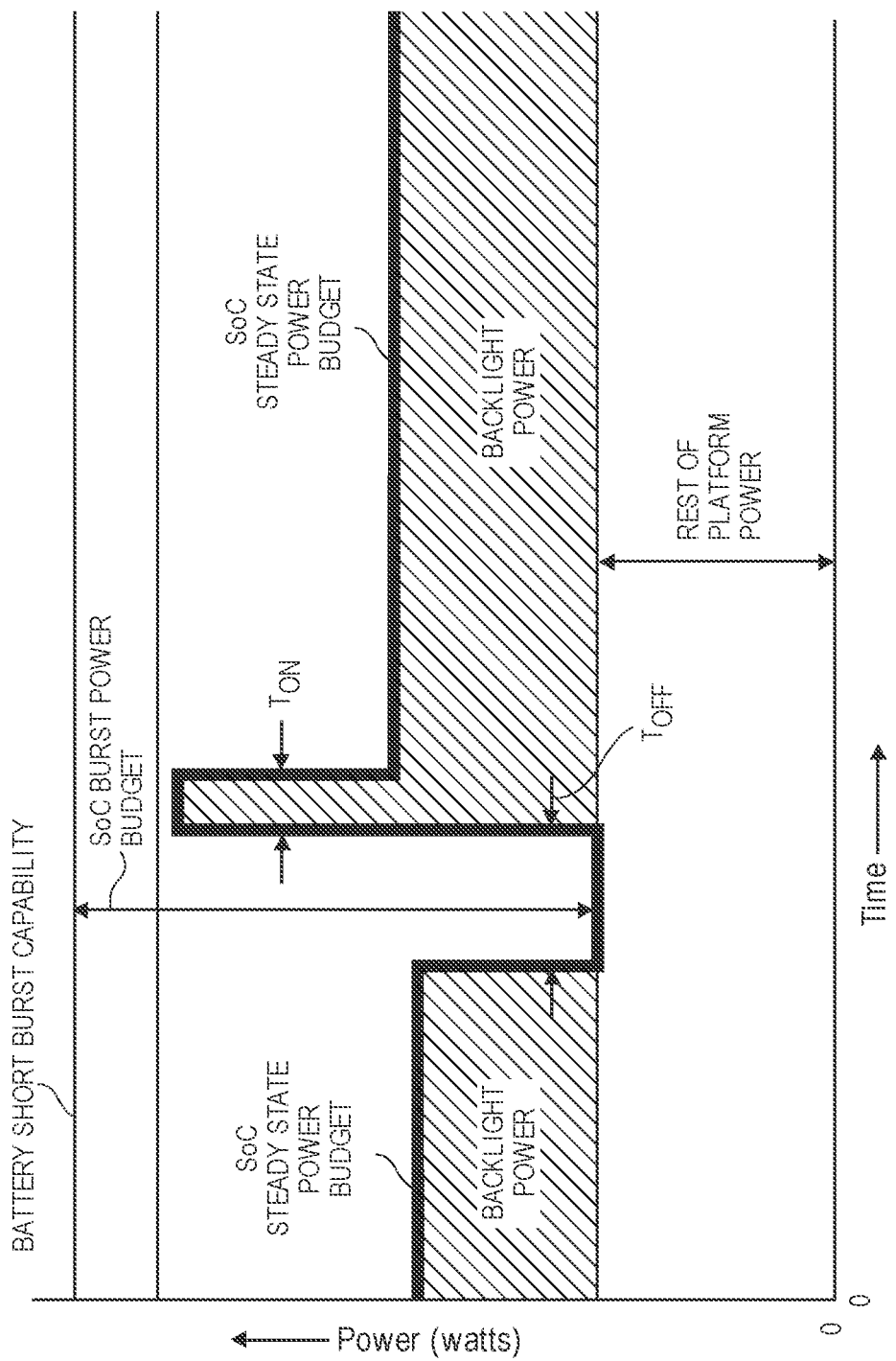
FIG. 3 shows a diagram of how the power budget may be redistributed over time within the computer system, according to an embodiment of the invention.

FIG. 3 shows a diagram of how the power budget may be redistributed over time within the computer system, according to an embodiment of the invention. In FIG. 3, backlight power may be reduced to zero for a time period $T_{off}$. In some embodiments, it may be reduced partially rather than completely removed, but in this example it is shown being reduced to zero. In turn, this power from the backlight may be redirected to the SoC, allowing for burst processing by the SoC during $T_{off}$. In some embodiments, burst processing may be accomplished by increasing the system clock to the SoC, but other techniques such as increasing voltage to the SoC may also be used. This reduction of power to the display, and the resultant reduction of luminance, may be short enough so that the result will not be perceptible to the human vision system.

In some embodiments, $T_{off}$ may be followed by another time period $T_{on}$ in which backlight power is increased to a level above the steady state backlight power. The level of this increase, and it's duration $T_{on}$, may be chosen so that the average luminance over the period $T_{off}+T_{on}$ is approximately equal to the average luminance before and after $T_{off}+T_{on}$. In some embodiments $T_{off}$ may be less than 3 ms, but other values may be used. In some embodiments, $T_{on}$ may be less than 2 ms, but other values may be used.

$T_{off}$ may repeat at regular intervals, and the frequency of repetition is referred to in this document as the 'flicker rate'. The maximum flicker rate (maximum rate of repetition) at which the flicker effect is noticeable to the human vision system is referred to herein as the 'flicker threshold'. The duration of $T_{off}$, the flicker rate, and the luminance of the display may all affect the flicker threshold. The level of luminance is sometimes measured in units called 'nits'.

Figure 4:
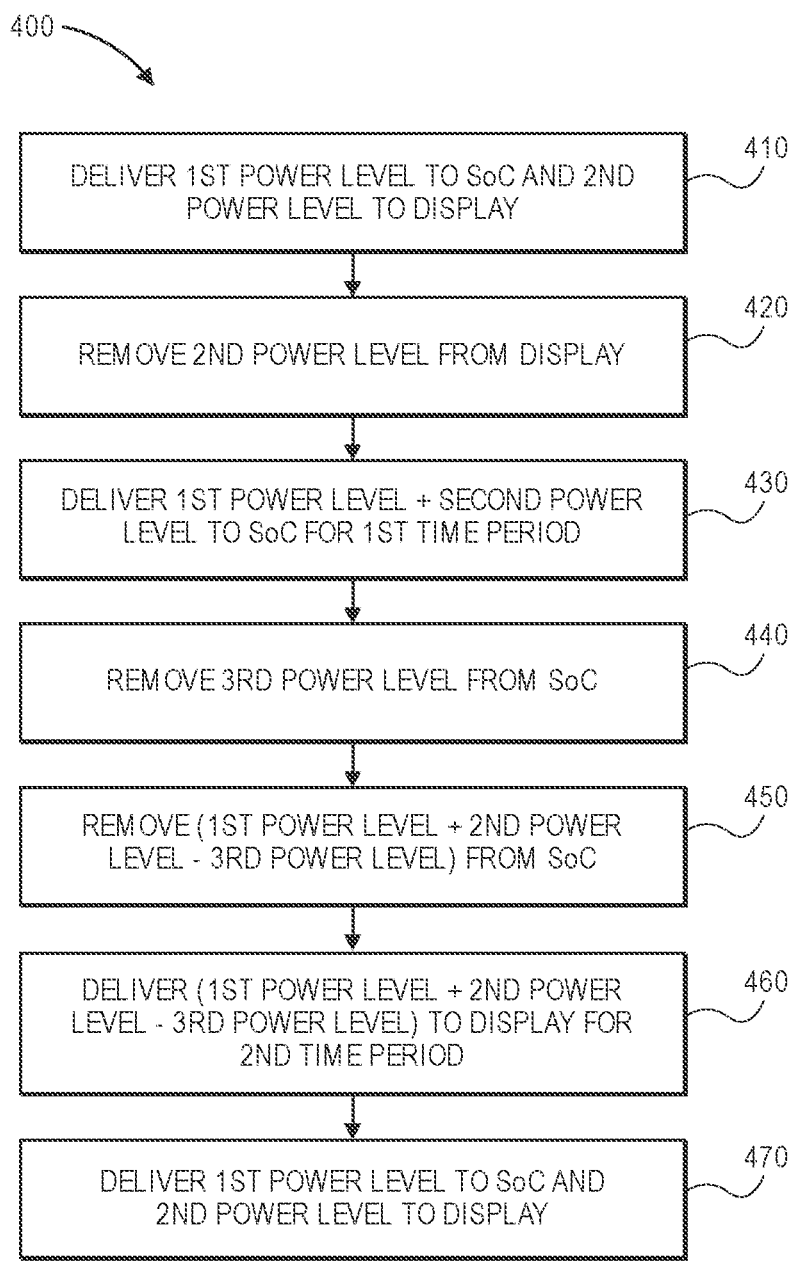
FIG. 4 shows a flow diagram of a method of redirecting power from one device to an SoC, according to an embodiment of the invention.

FIG. 4 shows a flow diagram of a method of redirecting power from one device in a computer system to an SoC in that computer system, according to an embodiment of the invention. In flow diagram 400, at 410 a first power level may be delivered to the SoC and a second power level may be delivered to another part of the system, which in this example may be a display. Comparing this to FIG. 3, the first power level may be the Soc power budget and the second power level may be the backlight power budget.

At 420, the second power level may be removed from the display, reducing the display's power budget to zero. At the same time, or shortly thereafter, at 430 the first and second power budgets may be delivered to the SoC for a first period of time. In the example of FIG. 3, the first period of time may be $T_{off}$. During this period, the previously described burst processing by the SoC may take place during this time.

When the end of the first time period is reached, at 440 a third power level may be removed from the SoC. This may leave the power distribution during the second time period ($T_{on}$) as indicated at 450 and 460, where the power delivered to the SoC is a third power level, and the power delivered to the display may be equal to (the first power level+the second power level−the third power level). This is indicated in FIG. 3 as the high $T_{on}$ pulse. At the end of $T_{on}$, at 470 the first and second power levels may be redistributed as described in 410, completing the cycle shown in FIG. 3.

Figure 5:
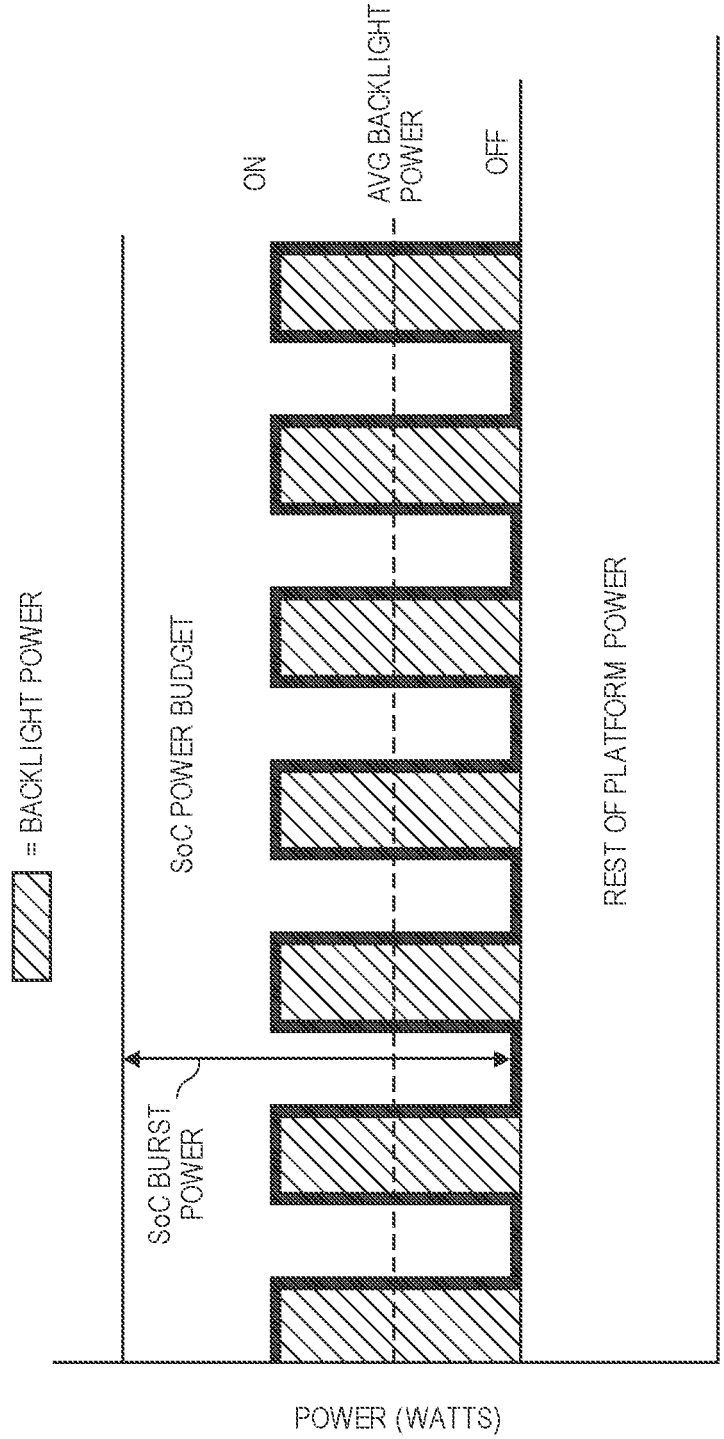
FIG. 5 shows an alternative to the power budget redistribution of FIG. 3, according to an embodiment of the invention.

FIG. 5 shows an alternative to the power budget redistribution of FIG. 3, according to an embodiment of the invention. FIG. 5 indicates a pulse width modulation (PWM) application of power to the display, in which power to the display is delivered in a continuing series of on-off pulses. Power is shown as being delivered during the 'on' phase of each pulse, and not delivered during the 'off' phase of each pulse, with an average backlight power controlling the luminosity perceived by a human viewer. A 50% duty cycle is indicated, with the average backlight power being at the mid-point between the 'on' and 'off' levels. But other duty cycles may also be used, which may change the level of average backlight power accordingly. Using the terminology in the description of FIG. 4, the 'on' power level in FIG. 5 may be equated to the second power level in FIG. 4, and the duration of time between 'on' pulses ('off' time) in FIG. 5 may be equated to the first time period of FIG. 4. This would make the duty cycle of the PWM signal=to (the cycle time of the PWM−the first time period of FIG. 4) divided by (the cycle time).

As in the previous descriptions, the power that is not being delivered to the display during the 'off' phase may be redirected to the SoC as part of the SoC burst processing power budget. The amount of this burst processing budget that is actually used by the SoC may depend on other factors, such as but not limited to the need for the extra performance during the 'off' phase, over-temp conditions in the SoC, etc. Although the illustrated embodiment indicates the available power is redirected to an SoC, in other embodiments this power may be redirected to other components in a system, such as but not limited to radio circuitry in a wireless device.

Examples

The following examples pertain to particular embodiments:

Example 1 includes a power control device having a processor, a power control module and a memory, the device adapted to: provide a first power budget to a first portion of a computer system; reduce the first power budget to the first portion of the computer system during a first time period; add the reduced power budget to a second power budget for the processor during the first time period; use the added power budget for burst processing by the processor during the first time period; and return the first power budget to the first portion of the computer system after the first time period.

Example 2 includes the device of example 1, wherein said reducing the first power budget, said adding the reduced power budget, said using the added power budget, and said returning the first power budget, are to be repeated at intervals of time Example 3 includes the device of example 1, wherein the first portion comprises a display.

Example 4 includes the device of example 1, wherein the reduced first power budget for the first time period is to cause a reduction in luminance from the display that is imperceptible to a human vision system.

Example 5 includes the device of example 1, wherein the first portion comprises a display.

Example 6 includes the device of example 2, wherein the reduced first power budget for the first time period is to cause a reduction in luminance from the display that is imperceptible to a human vision system.

Example 7 includes the device of example 2, wherein: the device is to deliver power to the first portion using pulse width modulation (PWM); the intervals of time are to be a cycle time of the PWM; a duty cycle of the PWM is to be (a duration of the interval–the first time period)/the duration of the interval).

Example 8 includes a method of redistributing power in a computer system for burst processing, the method comprising: providing a first power level to a first portion of a computer system and a second power level to a system on a chip (SoC); reducing the first power level to the first portion during a first time period; delivering, during the first time period, the first power level and the second power level to the SoC during the first time period; and returning the first power level to the first portion of the computer system after the first time period.

Example 9 includes the method of example 8, further comprising: at an end of the first time period, removing a third power level from the Soc, while applying an amount of power to the display equal to (the first power level plus the second power level minus the third power level), and maintaining these levels for a second time period.

Example 10 includes the method of example 9, further comprising: at an end of the second time period, delivering the first power level to the first portion and delivering the second power level to the SoC.

Example 11 includes the method of example 8, wherein the first time period has a duration of less than 4 milliseconds.

Example 12 includes the method of example 9, wherein the second time period has a duration of less than 2 milliseconds.

Example 13 includes the method of example 9, further comprising: delivering power to the first portion using pulse width modulation (PWM); repeating said providing, reducing, delivering, and returning at regular intervals of time; wherein the intervals of time are to be a cycle time of the PWM; wherein a duty cycle of the PWM is (a duration of the interval–the first time period)/the duration of the interval).

Example 14 includes a computer readable non-transitory storage medium that contains instructions, which when executed by one or more processors result in performing operations for redistributing power in a computer system for burst processing, the operations comprising: providing a first power level to a first portion of a computer system and a second power level to a system on a chip (SoC); reducing the first power level to the first portion during a first time period; delivering, during the first time period, the first power level and the second power level to the SoC during the first time period; and returning the first power level to the first portion of the computer system after the first time period.

Example 15 includes the medium of example 14, wherein the operations further comprise: at an end of the first time period, removing a third power level from the SoC, while applying an amount of power to the display equal to (the first power level plus the second power level minus the third power level), and maintaining these levels for a second time period.

Example 16 includes the medium of example 15, further comprising: at an end of the second time period, delivering the first power level to the first portion and delivering the second power level to the SoC.

Example 17 includes the medium of example 14, wherein the first time period has a duration of less than 4 milliseconds.

Example 18 includes the medium of example 15, wherein the second time period has a duration of less than 2 milliseconds.

Example 19 includes the medium of example 15, further comprising: delivering power to the first portion using pulse width modulation (PWM); repeating said providing, reducing, delivering, and returning at regular intervals of time; wherein the intervals of time are to be a cycle time of the PWM; wherein a duty cycle of the PWM is (a duration of the interval–the first time period)/the duration of the interval).

The foregoing description is intended to be illustrative and not limiting. Variations will occur to those of skill in the art. Those variations are intended to be included in the various embodiments of the invention, which are limited only by the scope of the following claims.

What is claimed is:
1. A power control device, having:
a processor,
a power control module, and
a memory, the device adapted to
provide a first power budget to a first portion of a computer system, wherein the first portion comprises a display;
reduce the first power budget to the first portion of the computer system during a first time period by an amount;
add at least a portion of the amount to a second power budget for the processor during the first time period;
use the added power budget for burst processing by the processor during the first time period;
at an end of the first time period, reduce the processor to a third power budget, and apply a power budget to the display greater than the first power budget and less than or equal to the first power budget plus the second power budget minus the third power budget; and
return the first power budget to the first portion of the computer system after the first time period.

2. The device of claim 1, wherein said reducing the first power budget, said adding the reduced power budget, said using the added power budget, and said returning the first power budget are to be repeated at intervals of time.

3. The device of claim 2, wherein the reduced first power budget for the first time period is to cause a reduction in luminance from the display that is imperceptible to a human vision system.

4. The device of claim 2, wherein:
the device is to deliver power to the first portion using pulse width modulation (PWM);
the intervals of time are to be a cycle time of the PWM; and
a duty cycle of the PWM is to be (a duration of the interval–the first time period)/the duration of an interval.

5. The device of claim 1, wherein the reduced first power budget for the first time period is to cause a reduction in luminance from the display that is imperceptible to a human vision system.

6. A method of redistributing power in a computer system for burst processing, the method comprising:
providing a first power level to a first portion of the computer system and a second power level to a system on a chip (SoC), wherein the first portion comprises a display;
reducing the first power level to the first portion during a first time period by an amount;

delivering, during the first time period, the second power level and at least a portion of the amount to the SoC;

at an end of the first time period, reducing the SoC to a third power level, and applying a power level to the display greater than the first power level and less than or equal to the first power level plus the second power level minus the third power level; and returning the first power level to the first portion of the computer system after the first time period.

7. The method of claim 6, further comprising:

at an end of the first time period, maintaining the third power level and the power level applied to the display for a second time period.

8. The method of claim 7, further comprising:

at an end of the second time period, delivering the first power level to the first portion, and delivering the second power level to the SoC.

9. The method of claim 7, wherein the second time period has a duration of less than 2 milliseconds.

10. The method of claim 7, further comprising:

delivering power to the first portion using pulse width modulation (PWM); and repeating said providing, reducing the first power level, delivering, and returning at regular intervals of time;

wherein the intervals of time are to be a cycle time of the PWM; and a duty cycle of the PWM is (a duration of the interval−the first time period)/the duration of an interval.

11. The method of claim 6, wherein the first time period has a duration of less than 4 milliseconds.

12. A computer-readable, non-transitory storage medium that contains instructions that, when executed by one or more processors, result in performing operations for redistributing power in a computer system for burst processing, the operations comprising:

providing a first power level to a first portion of the computer system and a second power level to a system on a chip (SoC), wherein the first portion comprises a display;

reducing the first power level to the first portion during a first time period by an amount;

delivering, during the first time period, the second power level and at least a portion of the amount to the SoC;

at an end of the first time period, reducing the SoC to a third power level, and applying a power level to the display greater than the first power level and less than or equal to the first power level plus the second power level minus the third power level; and returning the first power level to the first portion of the computer system after the first time period.

13. The medium of claim 12, wherein the operations further comprise:

at an end of the first time period, maintaining the third power level and the power level applied to the display for a second time period.

14. The medium of claim 13, the operations further comprising:

at an end of the second time period, delivering the first power level to the first portion and delivering the second power level to the SoC.

15. The medium of claim 13, wherein the second time period has a duration of less than 2 milliseconds.

16. The medium of claim 13, the operations further comprising:

delivering power to the first portion using pulse width modulation (PWM); and repeating said providing, reducing the first power level, delivering, and returning at regular intervals of time;

wherein the intervals of time are to be a cycle time of the PWM; and a duty cycle of the PWM is (a duration of the interval−the first time period)/the duration of an interval.

17. The medium of claim 12, wherein the first time period has a duration of less than 4 milliseconds.

* * * * *